US011334000B2

(12) United States Patent
McDaniel et al.

(10) Patent No.: US 11,334,000 B2
(45) Date of Patent: May 17, 2022

(54) ELECTROMAGNETS AND PRINT SUBSTANCE CONTAINERS (71) Applicant: HEWLETT-PACKARD DEVELOPMENT COMPANY, L.P., Spring, TX (US)

(72) Inventors: Gabriel Scott McDaniel, Boise, ID (US); Mike Allyn, Boise, ID (US); Sean Daniel Fitzgerald, Boise, ID (US); Jeff Luke, Boise, ID (US); Dennis Alan Abramsohn, Boise, ID (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/043,346

(22) PCT Filed: Jun. 21, 2018

(86) PCT No.: PCT/US2018/038717
§ 371 (c)(1),
(2) Date: Sep. 29, 2020

(87) PCT Pub. No.: WO2019/245560
PCT Pub. Date: Dec. 26, 2019

(65) Prior Publication Data
US 2021/0063912 A1    Mar. 4, 2021

(51) Int. Cl.
*G03G 15/00*     (2006.01)
*G03G 15/08*     (2006.01)
*G03G 15/10*     (2006.01)

(52) U.S. Cl.
CPC ..... *G03G 15/0889* (2013.01); *G03G 15/0877* (2013.01); *G03G 15/104* (2013.01); *G03G 2215/066* (2013.01)

(58) Field of Classification Search
CPC ............ G03G 15/0865; G03G 15/087; G03G 15/0877; G03G 15/0889; G03G 15/104; G03G 2215/0802; G03G 2215/0816
See application file for complete search history.

(56) References Cited

U.S. PATENT DOCUMENTS

| | | | |
|---|---|---|---|
| 3,631,904 A | 1/1972 | Mason et al. | |
| 3,739,396 A | 6/1973 | Harada et al. | |
| 5,699,842 A * | 12/1997 | Wegman | B65B 1/04 141/18 |
| 6,862,016 B2 | 3/2005 | Matsuura et al. | |
| 8,224,211 B2 | 7/2012 | Morimoto | |
| 8,989,611 B2 | 3/2015 | Leemhuis et al. | |
| 9,188,905 B2 | 11/2015 | Nagata | |
| 9,676,186 B2 | 6/2017 | Taff | |

(Continued)

FOREIGN PATENT DOCUMENTS

EP    3318957 A1    5/2018

*Primary Examiner* — Hoang X Ngo
(74) *Attorney, Agent, or Firm* — Staas & Halsey LLP (57) ABSTRACT Examples described herein relate to a print substance container consistent with the disclosure. For instance, the print substance container may comprise a print substance disposed inside of the print substance container and a first electromagnet formed of a wire coil positioned around the print substance container and extending along a length of the print substance container.

15 Claims, 5 Drawing Sheets

(56) References Cited

U.S. PATENT DOCUMENTS

2014/0270857 A1* 9/2014 Harpur ................ G03G 15/087
 399/262
2017/0176887 A1 6/2017 Bejat et al.

* cited by examiner

ELECTROMAGNETS AND PRINT SUBSTANCE CONTAINERS

CROSS REFERENCE TO RELATED APPLICATIONS

This application is a U.S. National Stage Application which claims the benefit under 35 U.S.C. § 371 of International Patent Application No. PCT/US2018/038717 filed on Jun. 21, 2018, the contents of which are incorporated herein by reference.

BACKGROUND

Imaging systems such as printers, copiers, etc. may be used to form markings on a print medium, such as text, images, etc. Imaging systems may form markings on the print medium and/or form a three-dimensional object by employing a print substance such as an ink, toner, and/or a three-dimensional printing substance such as three-dimensional printing powders, etc.

DETAILED DESCRIPTION

Imaging systems may include print substance containers to produce representation(s) of text, images, models etc. on print medium and/or produce three-dimensional objects. As used herein, "imaging system" refers to a hardware device with functionalities to physically produce representation(s) of text, images, models, etc. on a print medium and/or produce a three-dimensional object. Examples of imaging devices include ink/toner printers and/or three-dimensional printers, among other types of imaging devices.

The print substance disposed inside of the print substance container may be frequently agitated and/or manipulated to ensure the print substance flows out of the print substance container properly and maintains consistent properties needed for accurate functionality, such as charge level. Some imaging systems use paddles and/or augers to agitate and/or manipulate the print substance inside of the print substance container. However, the use of paddles and/or augers to agitate the print substance may cause the particles of the print substance to breakdown. For instance, the print substance may be bruised and/or damaged resulting in reduced quality representation(s) of text, images, models etc. on print medium and/or reduced quality three-dimensional objects. As used herein, "agitate" and/or "manipulate" refers to physically moving, stirring, and/or churning of a substance. In addition, agitate and/or manipulate the print substance with paddles, augers, etc. may cause mechanical wear on the imaging system reducing the life of the imaging system.

Accordingly, this disclosure describes electromagnets and print substance containers that agitate and/or manipulate print substance in a print substance container to reduce the breakdown of print substance particles during the agitation of print substance and reduce the mechanical wear of the imaging system caused by periodically agitating the print substance. As such, the print substance container may include a first electromagnet formed of a wire coil positioned around the print substance container to agitate the print substance in the print substance container.

Figure 1:
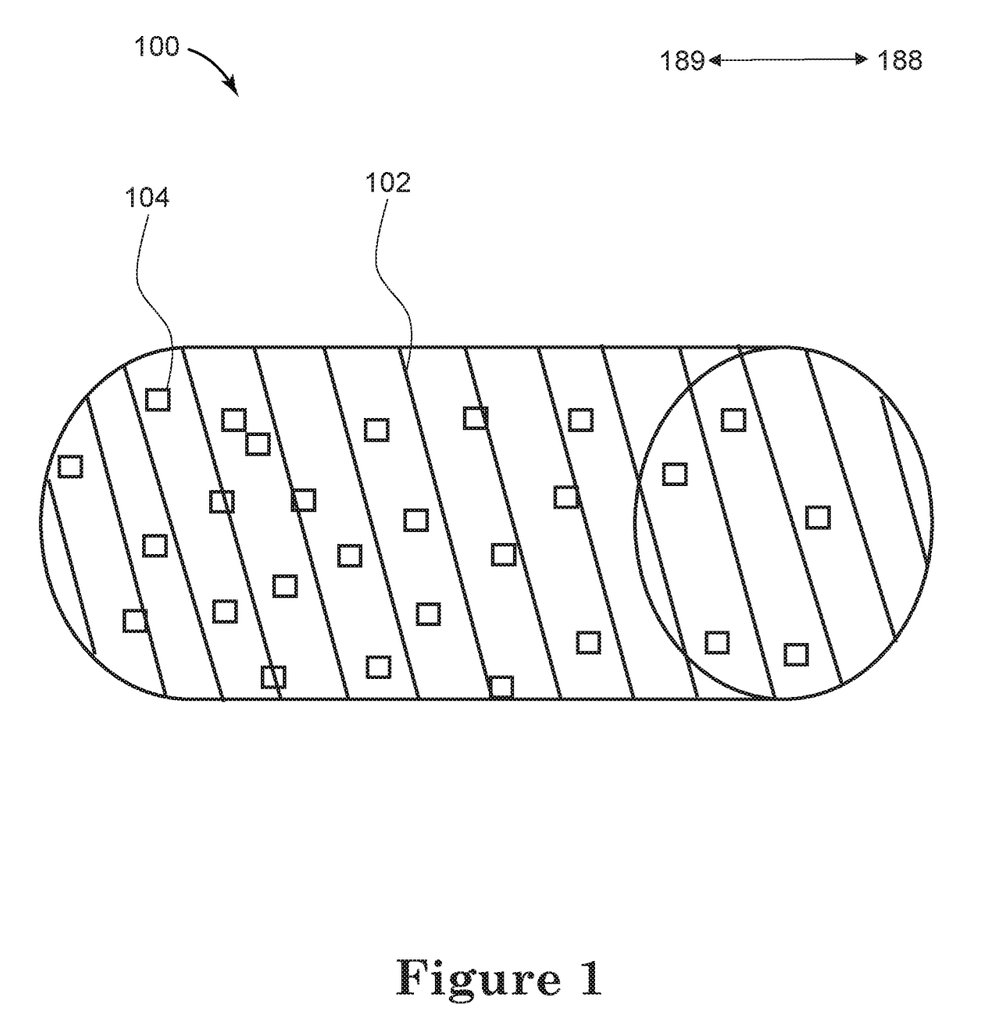
FIG. 1 illustrates an example of a print substance container consistent with the disclosure.

FIG. 1 illustrates an example of a print substance container 100 consistent with the disclosure. The print substance container 100 may be implemented in a variety of imaging systems, such as printers, copiers, etc., for example. In some examples, the print substance container 100 may house print substance 104. The print substance 104 may be deposited on print medium to form markings and/or physical representations on print medium. In addition, print substance 104 may be used in the production of objects such as three-dimensional objects.

In some examples, print substance 104 may include ink, toner, and/or three-dimensional printing substances such as print powders. For example, print substance containers 100 may include toner and/or a three-dimensional printing powder to form markings and physical representations on print medium and create three-dimensional objects. To produce quality physical representations and objects the print substance 104 may be agitated and or manipulated while in the print substance container 100. As used herein, "print substance container" refers to a vessel, bottle, bag, box, carton, or other suitable receptacle for the transfer and/or containment of a print substance.

In some examples, the print substance container 100 may include a first electromagnet 102 formed of a wire coil. As used herein, "electromagnet" refers to a type of magnet in which a magnetic field is produced by an electric current. In some examples, the first electromagnet 102 may be formed of wire coils including multiple windings and may be electrically separate units or serially connected windings. As used herein, "wire coil" refers to an electrical conductor such as a wire in the shape of a coil, spiral or helix. The first electromagnet 102 may be windings wrapped around the outside of the print substance container 100 to facilitate the movement of the print substance 104. However, this disclosure is not so limited. In some examples, the first electromagnet 102 may be windings wrapped around the inside of the print substance container 100. As used herein, "windings" refers to turns of a wire that forms a continuous coil through which an electric current can pass.

In some examples, the first electromagnet 102 may assist in agitating and/or manipulating the print substance 104 disposed in the print substance container 100. For example, the first electromagnet 102 may cause the ferromagnetic carrier beads (e.g., ferromagnetic carrier beads 208 of FIG. 2) to mix and/or agitate the print substance 104. In some examples, the first electromagnet 102 may cause print substance 104 to transition in a latitudinal direction. That is, the first electromagnet 102 may cause the print substance 104 to transition in a direction as denoted by arrow 188/189. For example, a turn may be activated to cause the print substance 104 to transition towards the activated turn. In some examples, the first electromagnet 102 may attract the ferromagnetic carrier beads which may cause print substance 104 to transition in a direction denoted by the axis 188/189. As used herein, "turn" refers to an individual loop or multiple tightly wound but physically separated sections of the wire coil.

In some examples, the first electromagnet 102 may attract a magnetic mixer (e.g., magnetic mixer 414 of FIG. 4) while activated to mix and/or agitate the print substance 104. For instance, the first electromagnet 102 may attract the magnetic mixer which may cause the magnetic mixer to transition in a direction denoted by the axis 188/189. The magnetic mixer may cause the print substance 104 to transition as the magnetic mixer. That is, a turn of the first electromagnet 102 may activate attracting the magnetic mixer towards the activated turn.

In some examples, turns of the first electromagnet 102 may be activated by an electric current flowing through the first electromagnet 102 and producing a magnetic field. For instance, an electric current may pass through a turn of the first electromagnet 102 to generate a magnetic field and activate the area within the turn of the first electromagnet 102. In some examples, an individual turn of the first electromagnet 102 may be activated at a time. However, this disclosure is not so limited. In some examples, multiple turns of the first electromagnet 102 may be activated at the same time. As used herein, "electric current" refers to the flow of electric charge into an object.

In some examples, the first electromagnet 102 may have a magnetic core to create a magnetic field. As used herein, "magnetic core" refers to a center comprised of ferromagnetic material to increase the magnetic field. In some examples, the first electromagnet 102 may include a magnetic core comprised of metals and/or a metal alloy. For example, the first electromagnet 102 may include a magnetic core comprised of steel, aluminum, iron, nickel, cobalt, or a combination thereof, amongst other possibilities.

Agitating the print substance 104 of the print substance container 100 by transitioning the ferromagnetic carrier beads and/or magnetic mixer with an activated first electromagnet group 102 may produce quality representation(s) of text, images, models, etc. on a print medium and/or produce a quality three-dimensional object without the user or imaging system performing periodic shaking. In addition, activating the ferromagnetic carrier beads and/or magnetic mixer with the first electromagnet group 102 may reduce the breakdown of print substance particles overtime creating quality representation(s) of text, images, models, etc. on print medium and/or creating quality three-dimensional object for the life of the print substance 104.

Figure 2:
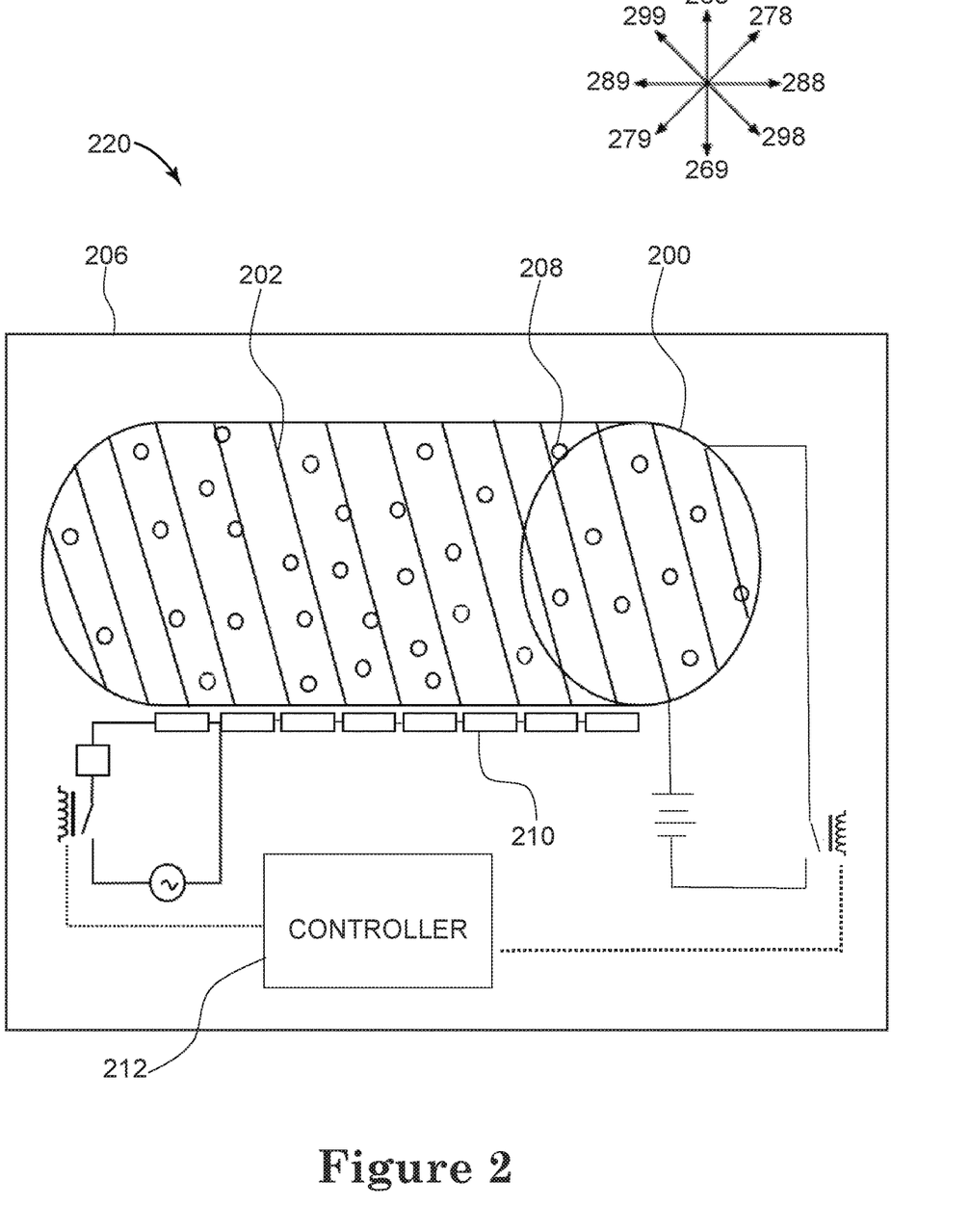
FIG. 2 illustrates an example of a system consistent with the disclosure.

FIG. 2 illustrates an example of a system 220 consistent with the disclosure. First electromagnet group 202 is analogous or similar to first electromagnet 102 of FIG. 1 and/or first electromagnet group 402 of FIG. 4. Print substance container 200 is analogous or similar to print substance container 100 and/or 400 of FIGS. 1 and 4, respectively.

In some examples, the system 220 may include a first electromagnet group 202 positioned around a print substance container 200. In addition, the first electromagnet group 202 may be connected to the system 220. For instance, the first electromagnet group 202 may be adjacent to the print substance container 200 when connected to the system 220. That is, the first electromagnet group 202 may be positioned around the print substance container 200 with a space between the print substance container 200 and the first electromagnet group 202.

In some examples, the print substance container 200 may include ferromagnetic carrier beads 208. As used herein, "ferromagnetic carrier beads" refers to particles with an internal property that may be manipulated and moved by an electromagnet. In some examples, the ferromagnetic carrier beads 208 may be comprised of steel, aluminum, iron, nickel, cobalt, or a combination thereof, amongst other possibilities. That is, the ferromagnetic carrier beads 208 may be comprised of ferromagnetic metals and metal alloys.

In some examples, the ferromagnetic carrier beads 208 may mix, manipulate, and/or agitate print substance inside of the print substance container 200. The ferromagnetic carrier beads 208 may cause the print substance to transition in directions 288 and 289 when the first electromagnet group 202 is activated. Activating the first electromagnet group 202 may attract the ferromagnetic carrier beads 208 to the activated first electromagnet group 202. For instance, a turn of the first electromagnet group 202 may activate causing the ferromagnetic carrier beads 208 to transition towards the activated turn of the first electromagnet group 202. As the ferromagnetic carrier beads 208 transition towards the activated turn of the first electromagnet group 202, the ferromagnetic carrier beads 208 may cause the print substance to mix, manipulate, and/or agitate. For example, as the ferromagnetic carrier beads 208 transition in the direction denoted by arrow 288/289 the ferromagnetic carrier beads 208 may cause the print substance to transition as well.

In some examples, an individual turn of the first electromagnet group 202 may activate to transition the ferromagnetic carrier beads 208. However, this disclosure is not so limited. In some examples, multiple turns of the first electromagnet group 202 may be activated at the same time to transition the ferromagnetic carrier beads 208.

As illustrated in FIG. 2, the system 220 may include a second electromagnet group 210. In some examples, the second electromagnet group 210 may be substantially perpendicular to the first electromagnet group 202. That is, the magnetic field from the second electromagnet group 210 may be substantially perpendicular to the magnetic field from the first electromagnet group 202. The second electromagnet group 210 may be a magnet adjacent to the print substance container 200 to facilitate the movement of the print substance. It should be understood that when an element is referred to as being "adjacent" to another element, it may be on, in contact, connected, next to, or coupled with the other element. In some examples, the second electromagnet group 210 may assist in agitating and/or manipulating the print substance disposed in the print substance container 200.

For example, the second electromagnet group 210 may cause ferromagnetic carrier beads 208 to mix and/or agitate the print substance. In some examples, the second electromagnet group 210 may cause print substance to transition in a longitudinal direction. That is, the ferromagnetic carrier beads 208 may cause the print substance to transition in directions 268 and 269 when the second electromagnet group 210 is activated. For instance, an activated second electromagnet group 210 may attract the ferromagnetic carrier beads 208 to the activated second electromagnet group 210 causing the print substance to physically move.

In some examples, an individual electromagnet of the second electromagnet group 210 may be activated to cause the ferromagnetic carrier beads 208 to transition towards the individual electromagnet of the second electromagnet group 210 that is activated. Transitioning the ferromagnetic carrier beads 208 towards an activated electromagnet of the second electromagnet group 210 may mix, agitate, and/or manipulate the print substance. For example, as the ferromagnetic carrier beads 208 transition in the direction denoted by arrow 268/269 the ferromagnetic carrier beads 208 may cause the print substance to transition.

In some examples, an individual electromagnet of the second electromagnet group 210 may be activated by electric currents flowing through the second electromagnet 210 interacting with the magnetic field of the second electromagnet group 210. For instance, an electric current may pass through the conductor of the individual electromagnet of the second electromagnet group 210 to generate a magnetic field and activate the individual electromagnet of the second electromagnet group 210. In some examples, an individual electromagnet of the second electromagnet group 210 may be activated at a time. However, this disclosure is not so limited. In some examples, multiple electromagnets of the second electromagnet group 210 may be activated at the same time.

In some examples, the electromagnets of the second electromagnet group 210 may have a magnetic center to create a magnetic field. In some examples, the electromagnets of the second electromagnet group 210 may include a magnetic center comprised of metals and/or a metal alloy. For example, the electromagnets of the second electromagnet group 210 may include a magnetic center comprised of steel, aluminum, iron, nickel, cobalt, or a combination thereof, amongst other possibilities.

In some examples, the second electromagnet group 210 may be adjacent to the bottom of the print substance container 200. However, this disclosure is not so limited. That is, in some examples, the second electromagnet group 210 may be adjacent to the top of the print substance container 200. While a total of one second electromagnet group 210 is illustrated in FIG. 2, the system 220 may include more second electromagnet group 210 adjacent to the print substance container 200. While some elements are designated as a "top" or a "bottom," it should be understood that such elements may correspond to other relative terms or possible orientations in some applications in order to practice the examples of this disclosure.

As illustrated in FIG. 2, the system 220 may include an imaging system 206. In some examples, the imaging system may include a controller 212. Controller 212 may activate the second electromagnet group 210. That is, the controller may activate each electromagnet of the second electromagnet group 210 individually or all together. As used herein, "activate" refers causing an electromagnet to become magnetic by introducing an electric current to an electromagnet. The controller 212 may cause the second electromagnet group 210 to transition the ferromagnetic carrier beads 208 by selectively activating and deactivating the plurality of electromagnets of the first electromagnet group 210. That is, the controller 212 may cause the second electromagnet group 210 to transition the ferromagnetic carrier beads 208 in a second direction (e.g., direction denoted by arrow 268/269) by selectively activating and deactivating adjacent electromagnets of the second electromagnet group 210. For instance, the controller 212 may cause the ferromagnetic carrier beads 208 to transition in a direction as denoted by arrow 268/269.

In some examples, the controller 212 may be connected to the second electromagnet group 210. In some examples, the controller 212 may activate the electromagnets of the second electromagnet group 210 to cause the ferromagnetic carrier beads 208 to move towards the activated electromagnet of the second electromagnet group 210. In addition, the controller 212 may activate a turn of the first electromagnet group 202 to cause the ferromagnetic carrier beads 208 to move towards the turn of the first electromagnet group 202. The controller 212 may cause turns of the first electromagnet group 202 to transition the ferromagnetic carrier beads 208 by selectively activating and deactivating the turns of the first electromagnet group 202.

For example, the controller 212 may cause the first electromagnet group 202 to transition the ferromagnetic carrier beads 208 in a first direction (e.g., direction denoted by arrow 288/289) by selectively activating and deactivating adjacent turns of the first electromagnet group 202. For instance, the controller 212 may cause the ferromagnetic carrier beads 208 to transition in a direction as denoted by arrow 288/289. In some examples, the controller 212 may activate multiple turns of the first electromagnet group 202 at the same time. In some examples, the controller 212 may be connected to the first electromagnet group 202. It should be understood that when an element is referred to as being "connected to" another element, it may be directly on, in contact, or connected, to the other element or intervening elements may be present.

In some examples, the controller 212 may activate the turns of the first electromagnet group 202 and the electromagnets of the second electromagnetic group 210 based on the present location of the ferromagnetic carrier beads 208. That is, the controller 212 may identify the location of the ferromagnetic carrier beads 208 based on the magnetic field energy generated by the ferromagnetic carrier beads 208. For instance, the controller 212 may determine the location of the ferromagnetic carrier beads 208 based on the magnetic field energy perceived by the first electromagnet group 202 and the second electromagnet group 210. That is, the first electromagnet group 202 and the second electromagnet group 210 may feel the magnetic field energy generated by the ferromagnetic carrier beads 208 and the controller 212 may use the information from the first electromagnet group 202 and the second electromagnet group 210 to determine the location of the ferromagnetic carrier beads 208. As used herein, "present location" refers to the location of an object at the time of inquiry.

In some examples, the controller 212 may activate a turn of the first electromagnet group 202 and an electromagnet of the second electromagnet group 210 at the same time. Activating turns of the first electromagnet group 202 and electromagnets of the second electromagnet group 210 at the same time may cause the ferromagnetic carrier beads 208 to move in a diagonal direction. For instance, the ferromagnetic carrier beads 208 may move in a direction as denoted by arrow 278/279. In addition, activating the first electromagnet group 202 and the second electromagnet group 210 together may cause the ferromagnetic carrier beads 208 to transition in a direction as denoted by arrow 298/299.

Transitioning the ferromagnetic carrier beads 208 via a first electromagnet group 202 and a second electromagnet group 210 may agitate the print substance without causing mechanical wear on the imaging system 206. In addition, agitating print substance with ferromagnetic carrier beads 208 may reduce the breakdown of print substance particles and increase the usable life of the print substance.

In some examples, the controller 212 may control the concentration of the ferromagnetic carrier beads 208 in the print substance container 200 by controlling the amount of ferromagnetic carrier beads 208 that exits the print substance container 200. For instance, the controller 212 may determine the amount of ferromagnetic carrier beads 208 that exit and remain in the print substance container 200 during a printing process. As used herein, "printing process" refers to the process of creating physical representation(s) of text, images, models, etc. on a print medium and/or producing a three-dimensional object. That is, in some examples, the controller 212 may determine the amount of ferromagnetic carrier beads 208 that flow out of the print substance container 200. As used herein, "concentration" refers to the relative amount of a given substance contained within an object.

Although controller 212 is illustrated in FIG. 2 as being included in imaging system 206, examples of the disclosure are not so limited. For example, controller 212 may be remote from imaging system 206 and may communicate with imaging system 206 via a network relationship, such as a wired or wireless network.

Figure 3:
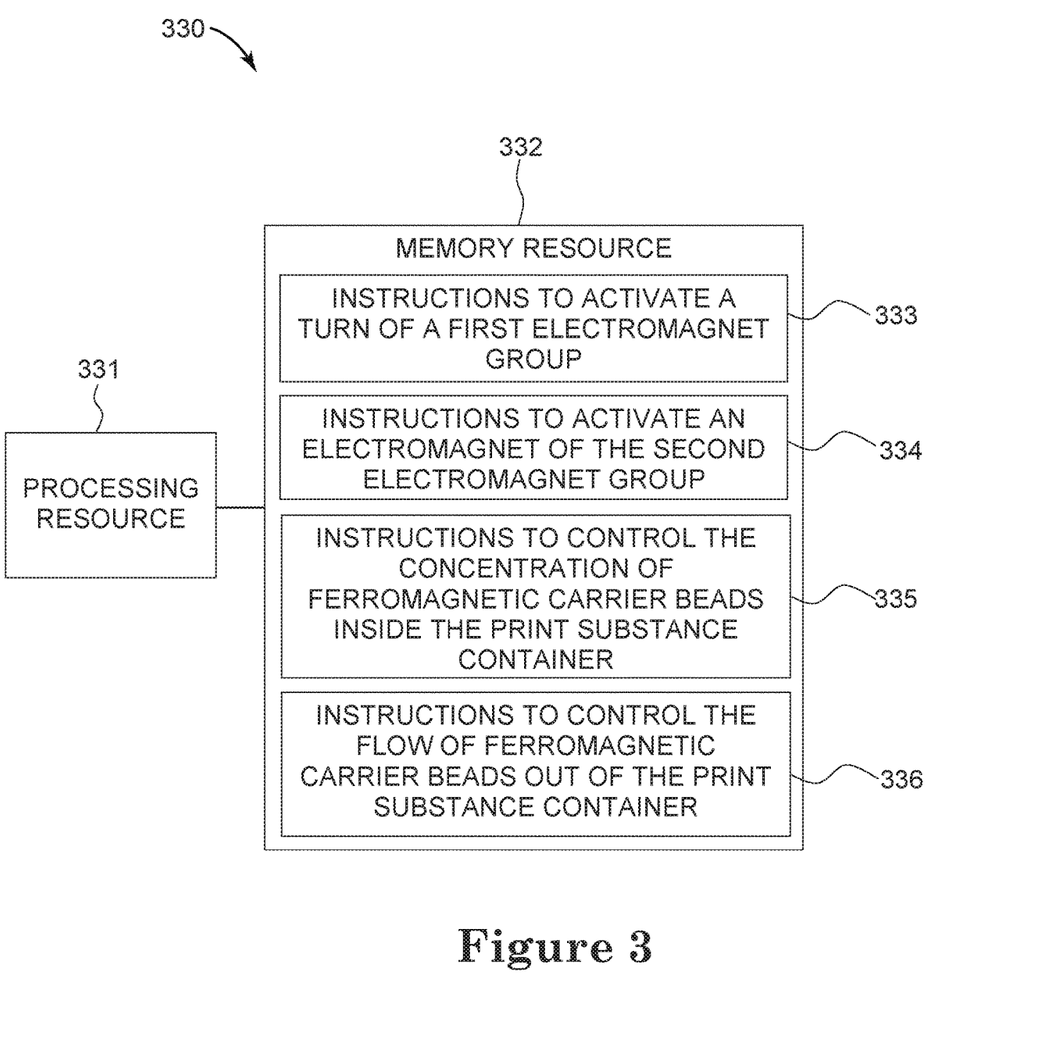
FIG. 3 illustrates an example of an apparatus suitable with a print substance container consistent with the disclosure.

FIG. 3 illustrates an example of an apparatus 330 suitable with a print substance container consistent with the disclosure. As illustrated in FIG. 3, the apparatus 330 includes a processing resource 331 and a memory resource 332. The processing resource 331 may be a hardware processing unit such as a microprocessor, microcontroller, application specific instruction set processor, coprocessor, network processor, or similar hardware circuitry that may cause machine-readable instructions to be executed. In some examples, the processing resource 331 may be a plurality of hardware processing units that may cause machine-readable instructions to be executed. The processing resource 331 may include central processing units (CPUs) among other types of processing units. The memory resource 332 may be any type of volatile or non-volatile memory or storage, such as random-access memory (RAM), flash memory, read-only memory (ROM), storage volumes, a hard disk, or a combination thereof.

The memory resource 332 may store instructions thereon, such as instructions 333, 334, 335, and 336. When executed by the processing resource 331, the instructions may cause the apparatus 330 to perform specific tasks and/or functions. For example, the memory resource 332 may store instructions 333 which may be executed by the processing resource 331 to activate a turn of the first electromagnet group. The first electromagnet group may be formed of a wire coil, including multiple windings, wrapped around the print substance container. In some examples, the first electromagnet group may extend along the length of the print substance container in a direction that is substantially perpendicular to the second electromagnet group. In some examples, the first electromagnet group may be activated to assist in the transition of print substance. For example, the first electromagnet group may activate to attract ferromagnetic carrier beads towards the activated first electromagnet group. That is, the first electromagnet group may cause the ferromagnetic carrier beads to move in a latitudinal direction (e.g., a direction as denoted by arrow 298/299 of FIG. 2).

As used herein, the term substantially intends that the characteristic does not have to be absolute, but is close enough so as to achieve the characteristic. For example, "substantially perpendicular" is not limited to absolute perpendicular. For example, "substantially parallel" is not limited to absolutely parallel.

The memory resource 332 may store instructions 334 which may be executed by the processing resource 331 to cause the apparatus 330 to activate an electromagnet of a second electromagnet group. The second electromagnet group may include a plurality of electromagnets. In some examples, the second electromagnet group may cause the ferromagnetic carrier beads to move in a longitudinal direction (e.g., a direction as denoted by arrow 268/269 of FIG. 2) towards the activated electromagnet when activated.

The memory resource 332 may store instructions 335 which may be executed by the processing resource 331 to cause the apparatus 330 to control the concentration of ferromagnetic carrier beads inside the print substance container. In some examples, as print substance exits the print substance container the ferromagnetic carrier beads may exit the print substance container. As such, the apparatus 330 may monitor and control the amount of ferromagnetic carrier beads that exits the print substance container to ensure that the print substance container has the proper amount of ferromagnetic carrier beads to agitate the print substance in the print substance container.

The memory resource 332 may store instructions 335 which may be executed by the processing resource 331 to cause the apparatus 330 to control the flow of ferromagnetic carrier beads out of the print substance container. That is, the apparatus 330 may ensure that there are enough ferromagnetic carrier beads inside of the print substance container as print substance exits the print substance container during a printing process.

Figure 4:
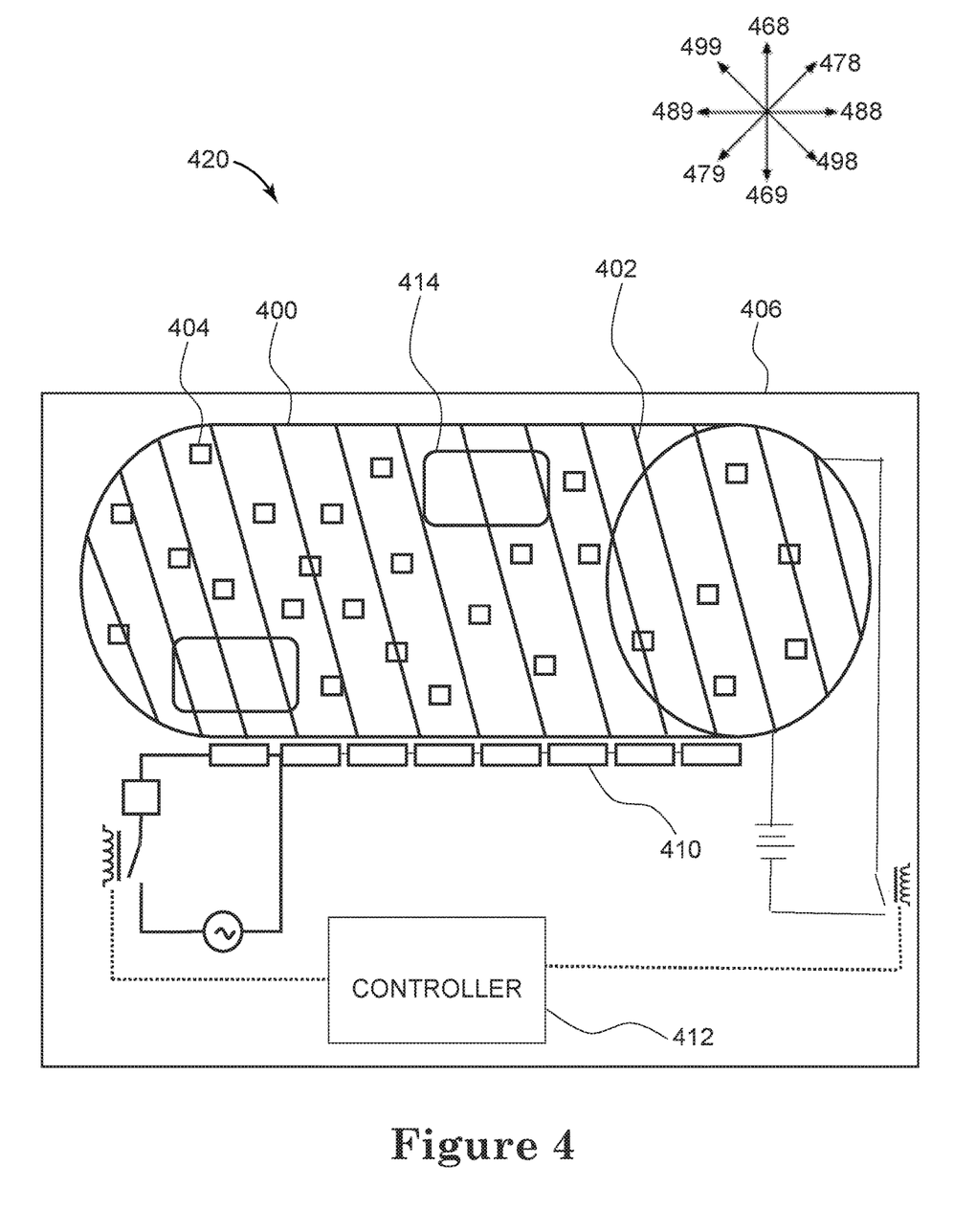
FIG. 4 illustrates an example of a system consistent with the disclosure.

FIG. 4 illustrates an example of a system 420 consistent with the disclosure. Second electromagnet group 410 is analogous or similar to second electromagnet group 210. Print substance 404 is analogous or similar to print substance 104. Controller 412 is analogous or similar to controller 212, Imaging system 406 is analogous or similar to imaging system 206.

As illustrated in FIG. 4, the system 420 may include print substance container 400. The print substance container 400 may include a magnetic mixer 414. While a total of two magnetic mixer 414 are illustrated in FIG. 4, the system 420 may include more magnetic mixers 414 or fewer magnetic mixers 414. As used herein, "magnetic mixer" refers to a device with magnetic properties that may be manipulated and moved by an electromagnet. In some examples, the magnetic mixer 414 may be comprised of steel, aluminum, iron, nickel, cobalt, or a combination thereof, amongst other possibilities.

In some examples, the magnetic mixer 414 may mix, manipulate, and/or agitate print substance 404 inside of the print substance container 400. The magnetic mixer 414 may cause the print substance 404 to transition in directions 488 and 489 when the first electromagnet group 402 is activated. Activating the first electromagnet group 402 may attract the magnetic mixer 414 to the activated first electromagnet group 402. For instance, a turn of the first electromagnet group 402 may activate causing the magnetic mixer 414 to transition towards the activated turn of the first electromagnet group 402. As the magnetic mixer 414 transition towards the activated turn of the first electromagnet group 402 the magnetic mixer 414 may cause the print substance 404 to physically move. For example, as the magnetic mixer 414 transition in the direction denoted by arrow 488/489 the magnetic mixer 414 may cause the print substance 404 to transition.

In some examples, an individual turn of the first electromagnet group 402 may activate to transition the magnetic mixer 414. However, this disclosure is not so limited. In some examples, multiple turns of the first electromagnet group 402 may be activated at the same time to transition the magnetic mixer 414.

In some examples, the system 420 may include a second electromagnet group 410. The second electromagnet group 410 may cause the magnetic mixer 414 to mix and/or agitate the print substance 404. In some examples, the magnetic mixer 414 may cause the print substance 404 to transition in directions 468 and 469 when the second electromagnet group 410 is activated. For instance, an activated second electromagnet group 410 may attract the magnetic mixer 414 to the activated second electromagnet group 410 causing the print substance 404 to mix and/or agitate.

In some examples, an individual electromagnet of the second electromagnet group 410 may be activated to cause the magnetic mixer 414 to transition towards the individual electromagnet of the second electromagnet group 410 that is activated. As the magnetic mixer 414 transition in the direction denoted by arrow 468/469 the magnetic mixer 414 may cause the print substance 404 to transition.

In some examples, the system 420 may include a controller 412 suitable with an imaging system 406. The controller 412 may cause turns of the first electromagnet group 402 to transition the magnetic mixer 414 by selectively activating and deactivating the turns of the first electromagnet group 402. For example, the controller 412 may cause the first electromagnet group 402 to transition the magnetic mixer 414 in a first direction, denoted by axis 488/489, by selectively activating and deactivating adjacent turns of the first electromagnet group 402. In some examples, the controller 412 may activate a turn of the first electromagnet 402 group to cause the magnetic mixer 414 to move towards the turn of the first electromagnet group 402.

The controller 412 may cause the second electromagnet group 410 to transition the magnetic mixer 414 by selectively activating and deactivating the plurality of electromagnets of the first electromagnet group 410. That is, the controller 412 may cause the second electromagnet group 410 to transition the magnetic mixer 414 in a second direction, denoted by axis 468/469, by selectively activating and deactivating adjacent electromagnets of the second electromagnet group 410.

In some examples, the controller 412 may activate the turns of the first electromagnet group 402 and the electromagnets of the second electromagnetic group 410 based on the present location of the magnetic mixer 414. That is, the controller 412 may identify the location of the magnetic mixer 414 based on the magnetic field energy generated by the magnetic mixer 414. For instance, the controller 412 may determine the location of the magnetic mixer 414 based on the magnetic field energy perceived by the first electromagnet group 402 and the second electromagnet group 410.

In some examples, the controller 412 may activate a turn of the first electromagnet group 402 and an electromagnet of the second electromagnet group 410 at the same time to cause the magnetic mixer 414 to move in a diagonal direction. For instance, the magnetic mixer 414 may move in a direction as denoted by axis 478/479. Similarly, activating the first electromagnet group 402 and the second electromagnet group 410 together may cause the magnetic mixer 414 to transition in a direction as denoted by axis 498/499.

In some examples, transitioning a magnetic mixer 414 via a first electromagnet group 402 and a second electromagnet group 410 may agitate the print substance 404 without causing mechanical wear on the imaging system 406. Additionally, agitating the print substance 404 with a magnetic mixer 414 may reduce the breakdown of print substance particles and increase the usable life of the print substance 404.

Figure 5:
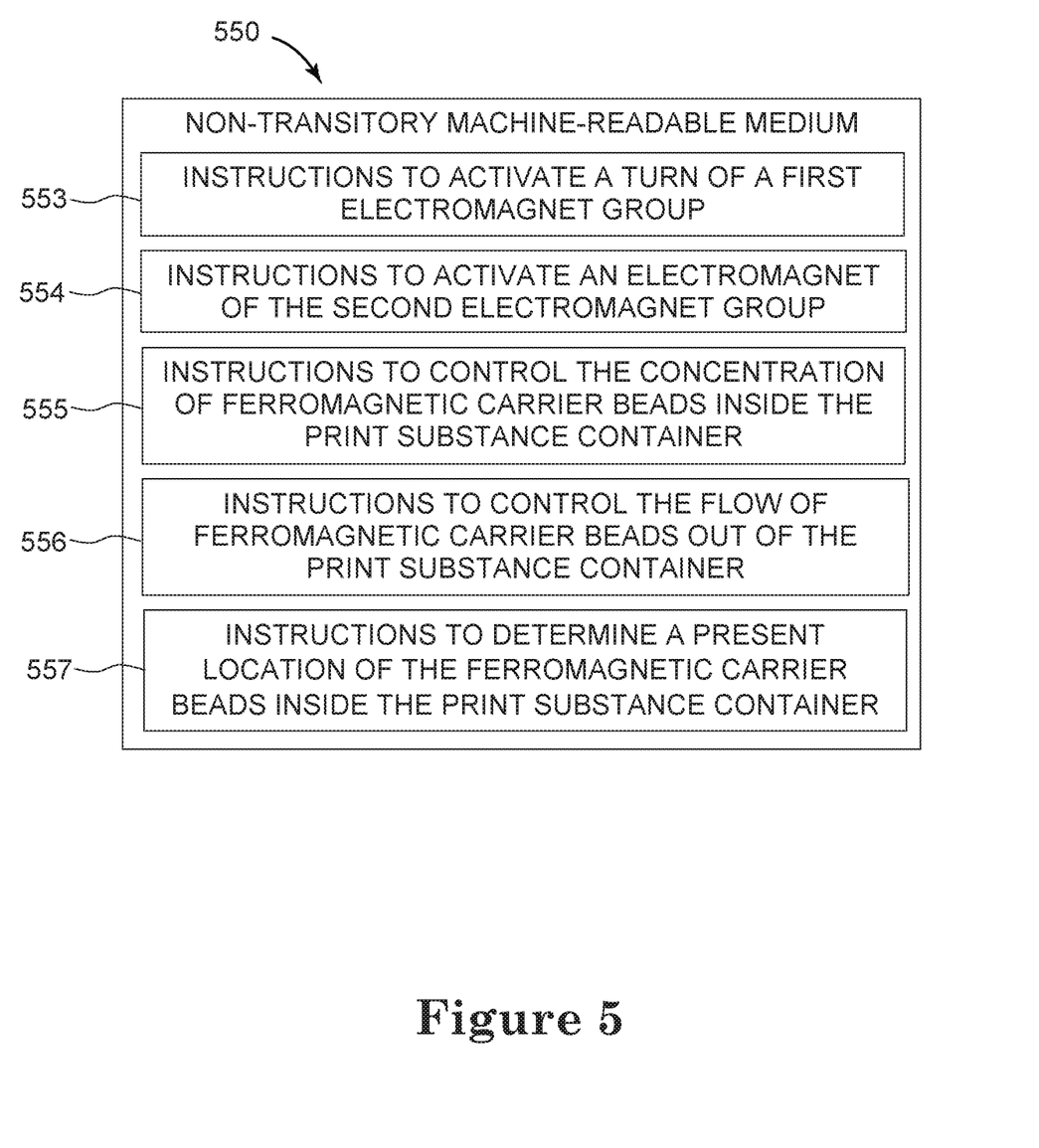
FIG. 5 illustrates an example diagram of a non-transitory machine readable medium suitable with a print substance container consistent with the disclosure.

FIG. 5 illustrates an example diagram of a non-transitory machine readable medium suitable with a print substance container consistent with the disclosure. A processing resource may execute instructions stored on the non-transitory machine readable medium 550. The non-transitory machine readable medium 550 may be any type of volatile or non-volatile memory or storage, such as random-access memory (RAM), flash memory, read-only memory (ROM), storage volumes, a hard disk, or a combination thereof.

The non-transitory machine readable medium 550 stores instructions 553 executable by a processing resource to activate a turn of the first electromagnet group. The first electromagnet group may include a plurality of turns. In some examples, the first electromagnet group may cause the ferromagnetic carrier beads to move in a latitudinal direction (e.g., a direction as denoted by arrow 288/289 of FIG. 2) towards the activated turn.

The non-transitory machine readable medium 550 stores instructions 554 executable by a processing resource to activate an electromagnet of a second electromagnet group. In some examples, the second electromagnet group may be activated to assist in the transition of print substance. For example, the second electromagnet group may activate to attract ferromagnetic carrier beads towards the activated second electromagnet group. That is, the second electromagnet group may cause the ferromagnetic carrier beads to move in a longitudinal direction (e.g., a direction as denoted by arrow 268/269 of FIG. 2) causing the print substance to move.

The non-transitory machine readable medium 550 stores instructions 555 executable by a processing resource to control the concentration of ferromagnetic carrier beads inside the print substance container. In some examples, controlling the concentration of the ferromagnetic carrier beads may ensure the print substance container has enough ferromagnetic carrier beads to agitate the print substance. For instance, as the print substance and the ferromagnetic carrier beads exits the print substance container the appropriate concentration of ferromagnetic carrier beads may be maintained in the print substance container.

The non-transitory machine readable medium 550 stores instructions 556 executable by a processing resource to control the flow of ferromagnetic carrier beads out of the print substance container. In some examples, the amount of ferromagnetic carrier beads that exits the print substance container may be monitored and controlled by instructions from the processing resource.

The non-transitory machine readable medium 550 stores instructions 557 executable by a processing resource to determine a present location of the ferromagnetic carrier beads inside the print substance container. In some examples, the first electromagnet group and the second electromagnet group may feel the magnetic field energy of the ferromagnetic carrier beads. The magnetic field energy felt by the first electromagnet group and the second electromagnet group may assist in determining the location of the ferromagnetic carrier beads. For instance, if an individual turn of the first electromagnet group feels a stronger magnetic field energy compared to the other turns of the first electromagnet group it may be determined that the ferromagnetic carrier beads are near the vicinity of the individual turn. Similarly, if an individual electromagnet of the first electromagnet group feels a stronger magnetic field energy compared to the other electromagnet of the second electromagnet group it may be determined that the ferromagnetic carrier beads are near the vicinity of the individual electromagnet.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

It should be understood that the descriptions of various examples may not be drawn to scale and thus, the descriptions may have a different size and/or configuration other than as shown therein.

What is claimed:

1. A print substance container comprising:
a container to contain a print substance to be disposed inside of the container;
a first electromagnet formed of a wire coil coiled around the container along a length of the container; and
a plurality of second electromagnets adjacent to the container.

2. The print substance container of claim 1, further comprising ferromagnetic carrier beads to transition the print substance disposed inside of the container.

3. The print substance container of claim 2, wherein the ferromagnetic carrier beads are comprised of metal, wherein the metal further comprises of steel, aluminum, iron, nickel, cobalt, or a combination thereof.

4. The print substance container of claim 2, wherein the adjacent position of a second electromagnet among the plurality of second electromagnets is positioned substantially perpendicular to the first electromagnet to facilitate movement of the print substance.

5. The print substance container of claim 4, wherein the first electromagnet and second electromagnet formed of wire coils control flow or concentration of ferromagnetic carrier beads inside and outside of the container.

6. The print substance container of claim 1, further comprising a magnetic mixer to transition the print substance disposed inside of the container.

7. The print substance container of claim 6, wherein to transition the print substance, the magnetic mixer is transition within the container responsive to activation of the first electromagnet.

8. A system comprising:
a print substance container including a container to contain ferromagnetic carrier beads to be disposed inside of the container;
a first electromagnet group including a wire coil coiled around the container;
a second electromagnet group including a plurality of electromagnets adjacent to the container; and
an imaging system including a controller to:
activate a plurality of turns of the first electromagnet group; and
activate a plurality of electromagnets of the second electromagnet group.

9. The system of claim 8, wherein the controller is to activate the plurality of turns of the first electromagnet group and the plurality of electromagnets of the second electromagnet group based on a present location where the ferromagnetic carrier beads are concentrated.

10. The system of claim 8, wherein the controller is to cause the plurality of turns of the first electromagnet group to transition the ferromagnetic carrier beads by selectively activating and deactivating the plurality of turns.

11. The system of claim 10, wherein the controller is to cause the plurality of electromagnets of the second electromagnet group to transition the ferromagnetic carrier beads in a second direction by selectively activating and deactivating adjacent plurality of electromagnets of the second electromagnet group.

12. The system of claim 8, wherein the controller is to cause the plurality of electromagnets of the second electromagnet group to transition the ferromagnetic carrier beads by selectively activating and deactivating the plurality of electromagnets of the second electromagnet group.

13. The system of claim 12, wherein the controller is to cause the plurality of turns of the first electromagnet group to transition the ferromagnetic carrier beads in a first direction by selectively activating and deactivating adjacent sections of the first electromagnet group.

14. A non-transitory machine readable medium storing instructions executable by a processor to:
activate a turn of a first electromagnet group, wherein the first electromagnet group is formed of wire coils coiled around a print substance container along a length of the print substance container in a direction that is substantially perpendicular to a second electromagnet group;
activate an electromagnet of the second electromagnet group, wherein the second electromagnet group includes a plurality of electromagnets;
control concentration of ferromagnetic carrier beads inside the print substance container; and
control flow of ferromagnetic carrier beads out of the print substance container.

15. The non-transitory machine readable medium of claim 14, further comprising instructions to determine a present location where the ferromagnetic carrier beads are concentrated inside the print substance container, based on the activation of the first electromagnet group and the second electromagnet group.

* * * * *